(12) United States Patent
Haronian et al.

(10) Patent No.: US 11,303,193 B2
(45) Date of Patent: Apr. 12, 2022

(54) DEVICE FOR CONVERTING BENDS TO ELECTRICITY

(71) Applicant: Enervibe Ltd., Hevel Eilot (IL)

(72) Inventors: Dan Haronian, Efrat (IL); Michael Haronian, Efrat (IL)

(*) Notice: Subject to any disclaimer, the term of this patent is extended or adjusted under 35 U.S.C. 154(b) by 104 days.

(21) Appl. No.: 16/780,926

(22) Filed: Feb. 4, 2020

(65) Prior Publication Data

US 2021/0211032 A1 Jul. 8, 2021

Related U.S. Application Data

(63) Continuation-in-part of application No. 16/735,719, filed on Jan. 7, 2020, now abandoned.

(51) Int. Cl.
*H02K 35/02* (2006.01)
*H02K 7/18* (2006.01)

(52) U.S. Cl.
CPC .......... *H02K 35/02* (2013.01); *H02K 7/1846* (2013.01)

(58) Field of Classification Search
CPC .......... H02K 35/00; H02K 35/02; H02K 7/00; H02K 7/18; H02K 7/184; H02K 7/1846
See application file for complete search history.

(56) References Cited

U.S. PATENT DOCUMENTS

| | | | |
|---|---|---|---|
| 2008/0264537 A1* | 10/2008 | Behrends | H02K 35/02 152/152.1 |
| 2008/0297119 A1* | 12/2008 | Frayne | H02K 7/1876 322/3 |

\* cited by examiner

*Primary Examiner* — Tran N Nguyen (57) ABSTRACT

A device for converting bends of a body to electricity, that is designed to be fixed to the body, that includes an electromagnetic device with a coil and a core, a magnet and a converter that is designed to convert bending of the body to a movement of the magnet relative to the electromagnetic device.

3 Claims, 14 Drawing Sheets

DEVICE FOR CONVERTING BENDS TO ELECTRICITY

TECHNICAL FIELD

The present disclosure relates to an energy harvester that converting bending of a mechanical structure to electricity.

BACKGROUND

This patent application relates to energy harvester that is based on converting bending of a body to electricity. For example, bending may be caused by bending of human limb, bending of tire (tyre), bending of sport devices such as balls and rackets. Applications may use such Bending Energy Harvester in order to power devices such as sensors that are attached to a body that go through bending or relative movement between different parts of the device. The body may be automobile, airplane wings, human limb or animal limbs for powering devices for tracking or health monitoring of livestock. Another example is to use such Bending Energy Harvester is for converting bending of a wing, mast or tree for harvesting power from wind and from water such as sea waves.

Patent KR101692022B1 disclose a broadband and high efficient energy harvester attached to a wheel of a vehicle to convert vibration energy of the vehicle into electric energy. According to an embodiment of this invention, the energy harvester converts the vibration energy of a wheel of a vehicle into electric energy. The energy harvester for a tire wheel of a vehicle comprises: a housing; a permanent magnet; a coil; and an energy storage unit. The housing is formed in a cylindrical curved shape and is arranged in a wheel of a vehicle along a circumferential direction. The permanent magnet is provided inside the housing. The coil is wound to be separated from an outer surface of the housing to perform a pendulum motion between both ends of the housing. The energy storage unit is electrically connected to the coil, and stores energy received from the coil.

Figure 1A:
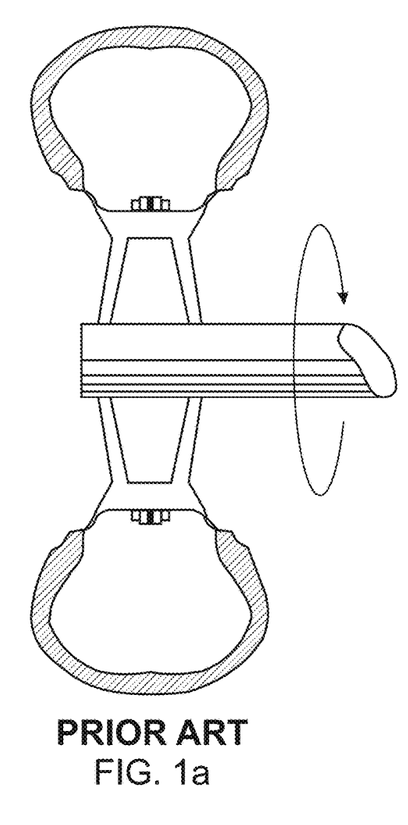
FIGS. 1a-1c: Prior art.
Figure 1B:
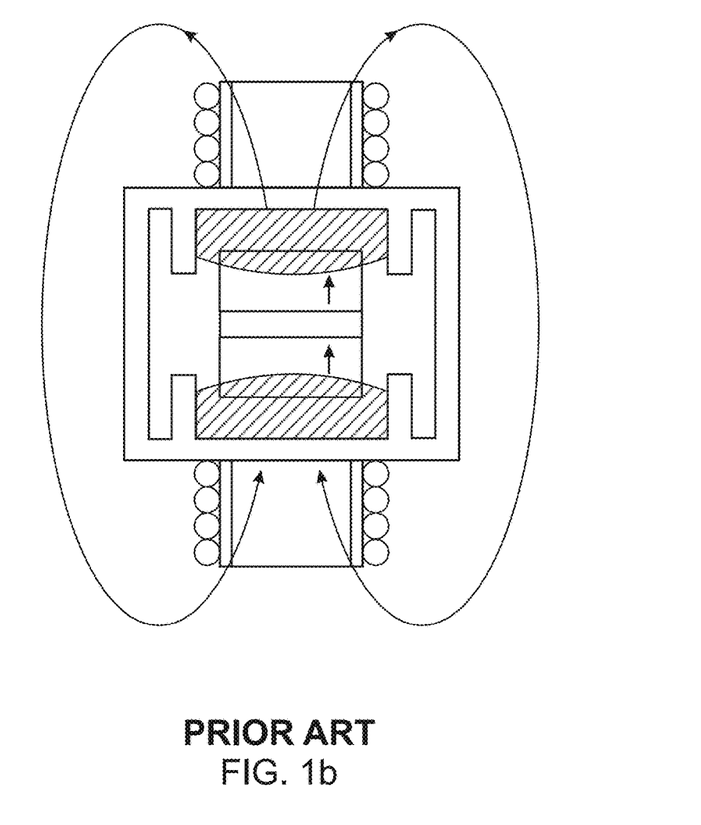

U.S. Pat. No. 7,009,310B2 disclose an autonomous power source comprises a power harvester mounted on a movable structure as shown in FIGS. 1a and 1b. The power harvester includes a coil, a magnet, and a low-friction ferrofluidic bearing in contact with the magnet, arranged such that the magnet and coil move with respect to each other when the structure is in motion such that an electrical current is produced in the coil. This current is converted to power and stored in an energy storage system and is thus available to power electronic circuitry. The magnet and bearing are preferably enclosed within a closed linear or circular tube, with the coil mounted around the exterior of the tube. The power harvester and battery are combined with one or more sensors and a wireless transmitter to form a tire pressure monitoring system.

Figure 1C:
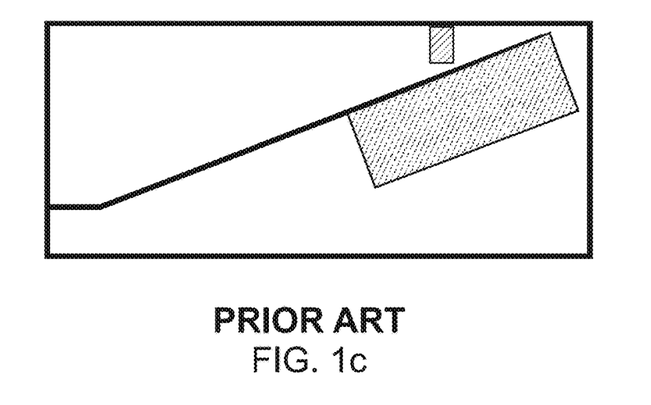

Patent JP2017506491A relates to an energy harvesting device that resonant beam comprising piezoelectric material as shown in FIG. 1c, that may be mounted on an automobile wheel or tire such that the vibration caused by the movement of the wheel or tire generates electric power to power devices placed inside the tire.

Patent KR101692022B1 and JP2017506491A are based on a pendulum movement that is sensitive to random vibration of the wheel. In U.S. Pat. No. 7,009,310B2 the magnet is fixed to a bearing that slides during wheel rotation. This movement generates random movement of the magnet relative to the coil that generates electricity in the coil.

SUMMARY

The present invention is related to energy harvester that is based on converting bending into electricity. Bending may be generated by bending of a body or by rotation of one part of the body relative to the other part such that bending is induced on the Bending Energy Harvester. The bending of the Bending Energy Harvester is used to generate electricity using electromagnetic device that comprises coil, core and magnets. In one embodiment the bending of the Bending Energy Harvester is translated into continues movement of the magnet relative to the electromagnetic device. In another embodiment the bending of the Bending Energy Harvester toggles between two states such that in each state the magnetic flux in the electromagnetic device is reversed. The patent demonstrates such Bending Energy Harvester using several non-limiting configurations that exemplifies the operation of such a Bending Energy Harvester. It is clear that these configurations are meant only to exemplify the operation of an energy that is based on bending of a body that results in movement of a magnet relative to an electromagnetic device or to exemplify the operation of a Bending Energy Harvester that is based on bending of a body that results in toggling between two states such that in each state the magnetic flux in the electromagnetic device is reversed.

DETAILED DESCRIPTION

In PCT number PCT/IL2019/051302 different mechanisms were discussed that converts the bending of a body into relative movement between different parts of the devices. This relative movement was converted into rotation of a generator that generates electricity. The current patent application uses the different embodiment described in PCT PCT/IL2019/051302, and other embodiments to exemplify an energy harvesting process that is a result of movement of a magnet relative to electromagnetic device.

Figure 2A:
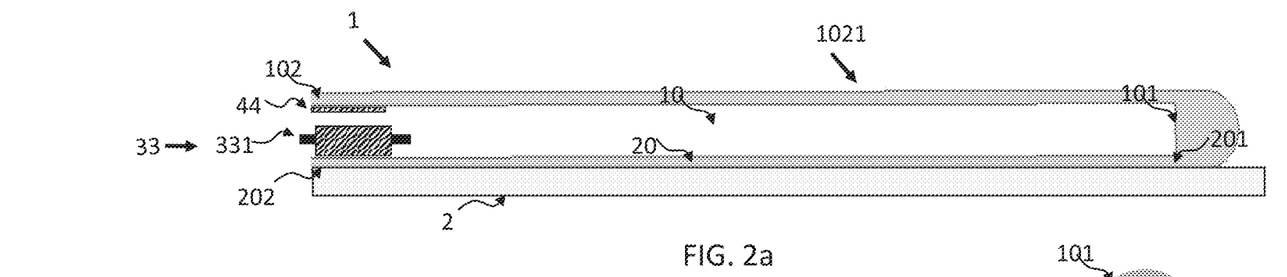
FIG. 2a depicts the Bending Energy Harvester in the first position.
Figure 2B:
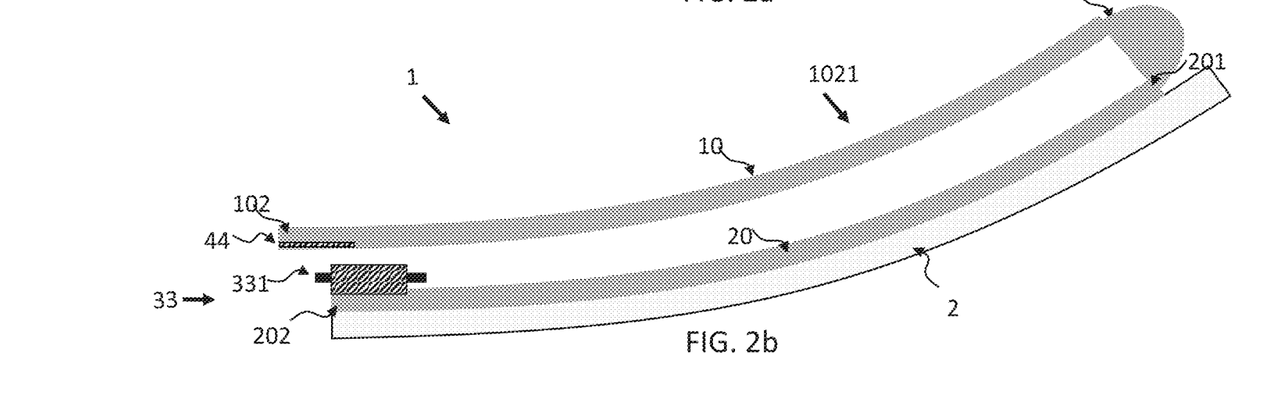
FIG. 2b depicts the Bending Energy Harvester in the bend position.

Reference is made to FIGS. 2a and 2b, which schematically illustrates one embodiment in this patent application. The harvester, attached to body 2, consists of a bending to movement device (1021) comprising two arms 10 and 20 that are connected to each other on one side (101 and 201) such that body bending results with a lateral movement of point 102 relative to point 202. Magnet 44 is connected to side 102 of the arm and an electromagnetic device 33 that comprises a coil 331 and a core 331, is connected to side 202 of the arm. A bending of the body generates a relative lateral movement between side 102 and side 202 such that the magnet moves relative to the coil and electrical power is generated in the coil.

We've tested this configuration in the lab. The setup included a coil resistance of 150 Ohm. A fast movement of a magnet along the coil generated 3.5V impulse with impulse width of 200 ms. With a 270 ohm load the calculated energy is 71 uJ.

Figure 3:
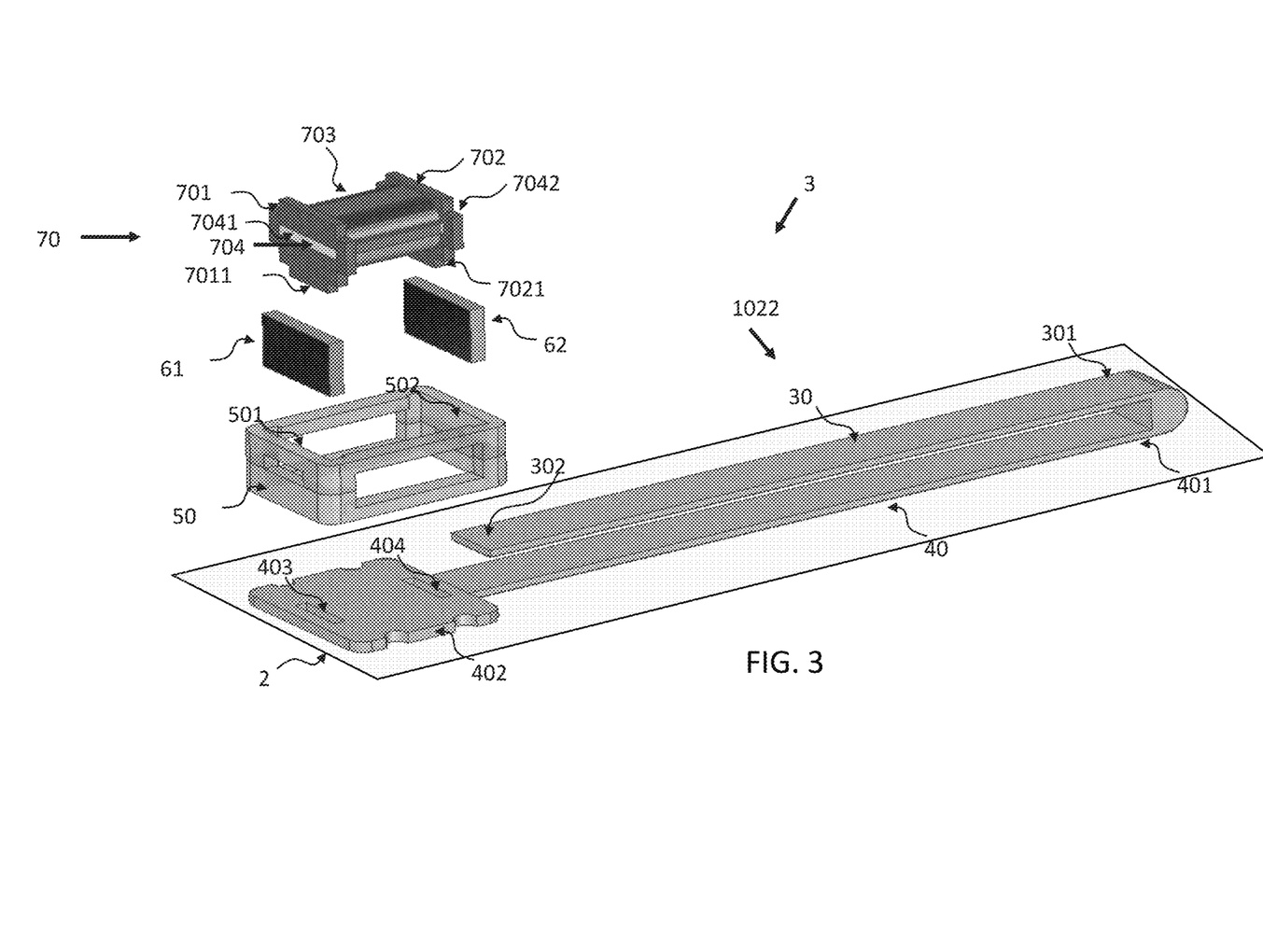
FIG. 3: A blowup view of another embodiment of invention that uses two magnets to toggle between two states.
Figures 4A, 4B:
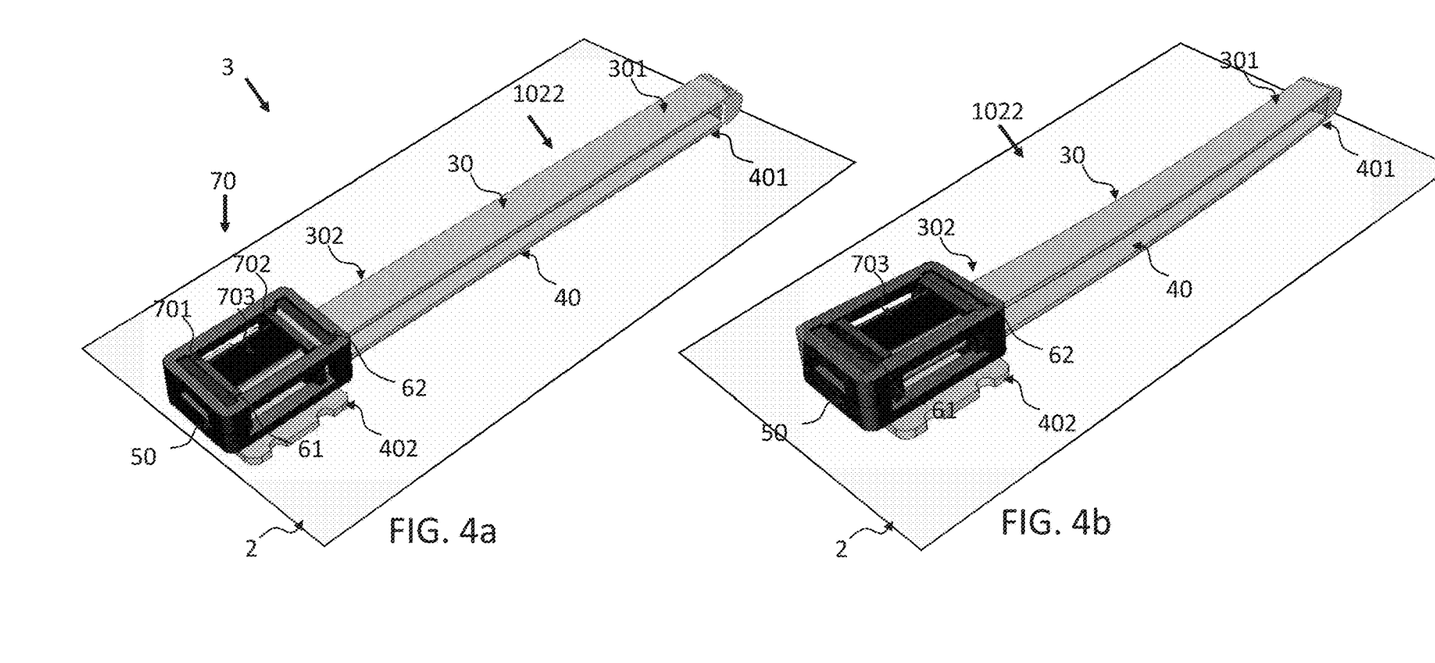
FIGS. 4a and 4b: The embodiment in FIG. 3 shown in two toggled states.

Reference is made to FIGS. 3 and 4, which schematically illustrates another embodiment in this patent application. FIG. 3 is a blow-up view of harvester (3). The harvester, attached to body 2, consists of a bending to movement device (1022) comprising two arms 30 and 40 that are connected to each other on one side (301 and 401) such that body bending results with a lateral movement of point 302 relative to plate 402. Frame 50 is connected to 302 such that it moves together with 302. Magnet 61 and 62 are connected to the two facing facets (501, 502) of the frame (50) such that the same magnetic poles of these magnets are facing each other. Electromagnetic unit 70 comprises holders 701 and 702, coil 703, and ferromagnetic core 704 such as metal with side 7041 and side 7042, such that the coil is wrapped around the ferromagnetic core and such that the coil wire has two ends. Side 7042 is marked in FIG. 3 but cannot be seen. Electromagnetic unit 70 is fixed to plate 402 using tenons 7011 and 7021 that are locked into dints 403 and 404, respectively.

FIGS. 4a and 4b shows the harvester in two states. In FIG. 4a the arms are at first state such that side 7041 of the core touches magnet 61. When arms 30, 40 bend frame 50 is pushed and with it the two magnets, such that now side 7042 touches magnet 62. This action reverses the polarity of the magnetic flux on the electromagnetic unit that generates an electromotive impulse between the coil ends.

We've found that flux inversion generates much higher power. Testing of such configuration with a 9.3 Ohm coil with core generated 3V on a 22 Ohm resistor yielding energy of 0.61 mJ per switching.

The reason for such higher energy can be learned from equation 1

$$E = -N \cdot d\Phi/dt \qquad (1)$$

Where E is the electromotive force measured in volt, N is the number of turns of the coil a and F is the magnetic flux. Moving a magnet relative to a coil generates $d\Phi/dt$. Clearly the large $d\Phi/dt$ the larger E. Reversing the magnetic flux results in a very high change to the magnetic flux and thus the high electromotive force. This configuration is referred to as toggling mode as the polarity of the magnetic flux is toggled between two states.

In order to generate large flux and therefore large flux changes, it is possible to use a ferroelectric core to confine the magnetic field close to the coil as shown in FIGS. 3 and 4.

Figure 5:
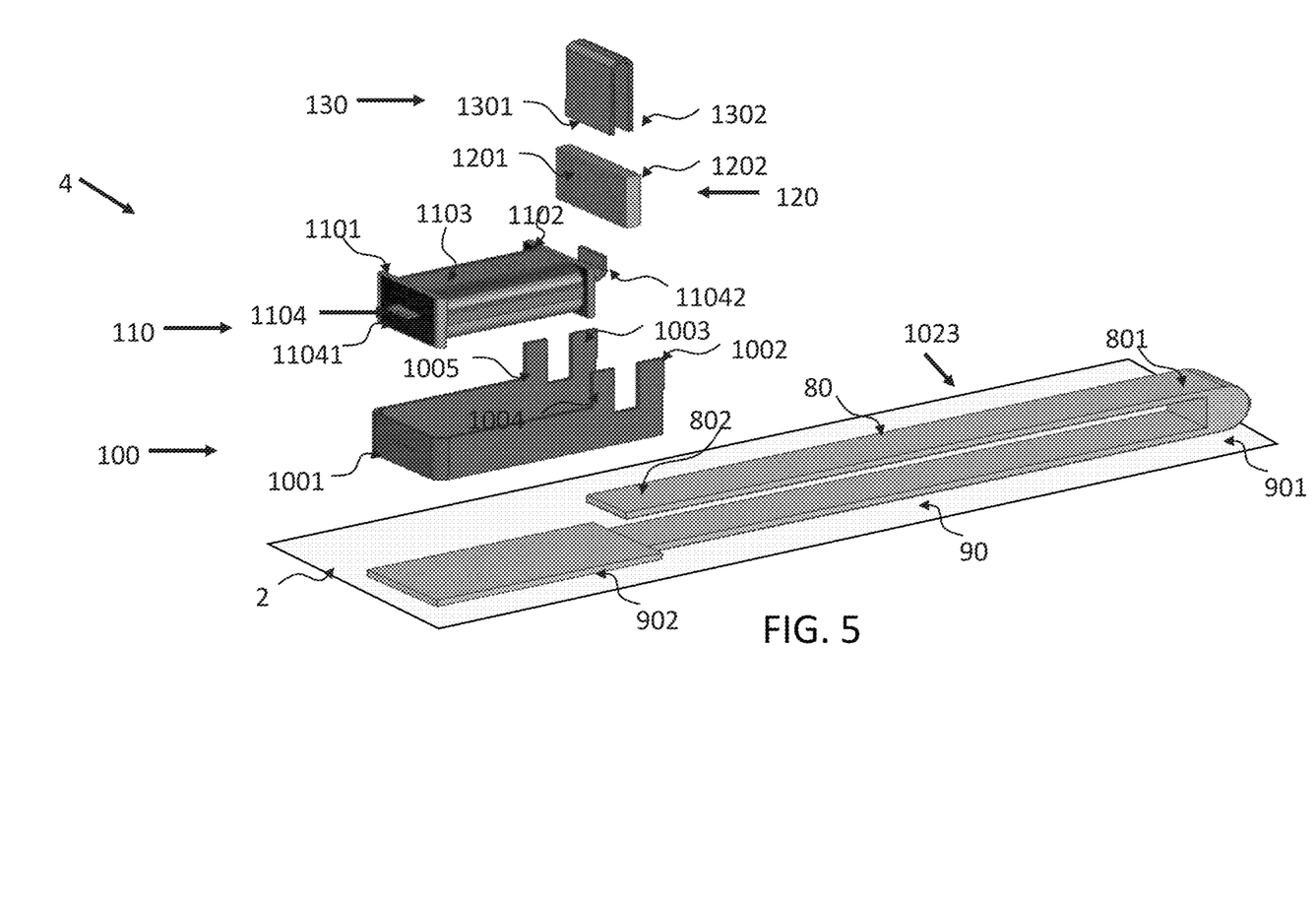
FIG. 5: A blowup view of another embodiment of invention that uses one magnet to toggle between two states.
Figure 6A:
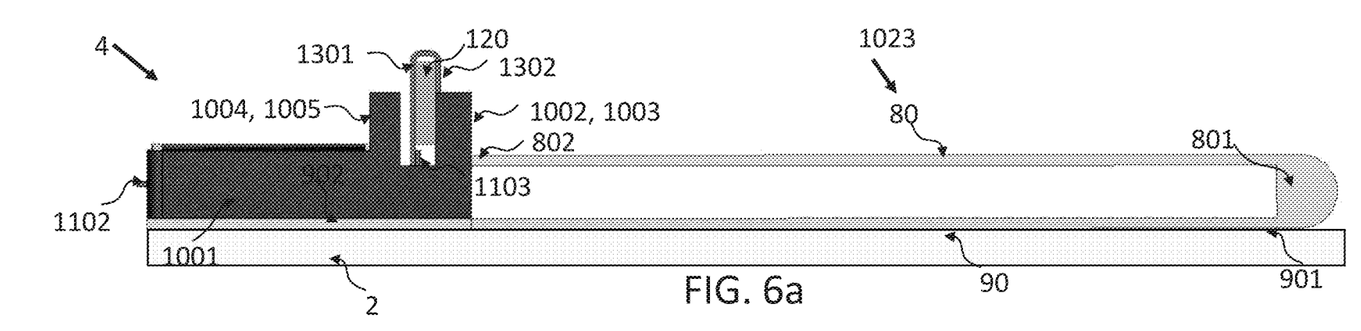
FIGS. 6a and 6b: The embodiment in FIG. 5 shown in two toggled states.
Figure 6B:
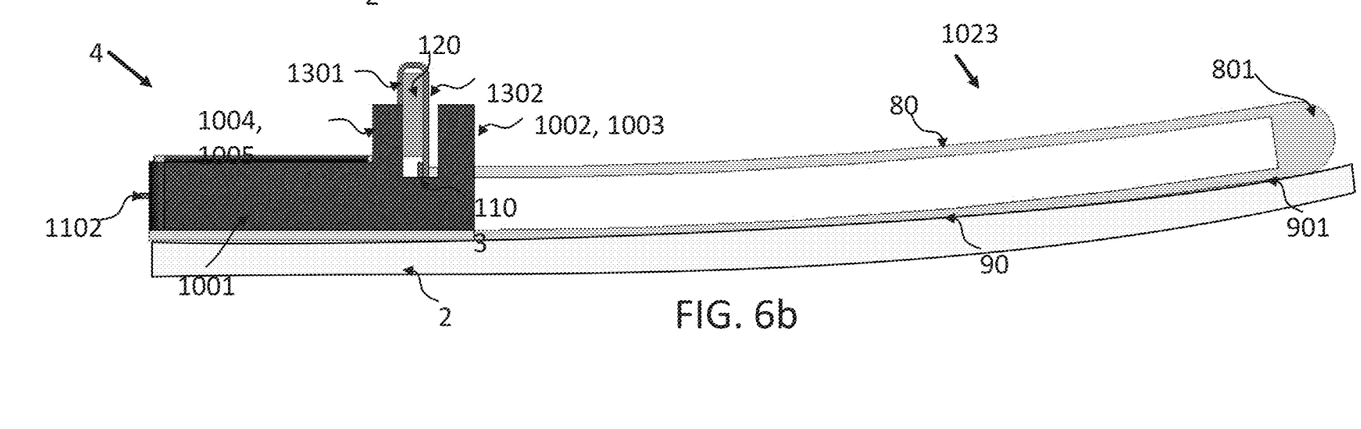

The embodiment shown in FIGS. 3 and 4 use two magnets in order to reverse the magnetic flux. Yet it is possible to use one magnet in order to reverse the magnetic flux as schematically shown in FIGS. 5 and 6. FIG. 5 is a blow-up view of the harvester. The harvester, attached to body 2, consists of a bending to movement device (1023) comprising two arms 80 and 90 that are connected to each other on one side (801 and 901) such that body bending results with a lateral movement of point 802 relative to plate 902. Frame 100 is made of ferromagnetic material such as metal, that is bent such that extensions 1002, 1003, 1004, 1005 are formed.

The electromagnetic unit 1100 comprise holders 1101 and 1102, coil 1103, and ferromagnetic core 1104 such as metal with sides 11041 and 11042, such that the coil is wrapped around the ferromagnetic core and such that the coil has two ends.

Unit 120 is a magnet such that side 1201 is one magnetic pole and side 1202 is the opposite magnetic pole. Unit 130 is ferromagnetic material such as metal.

FIGS. 6a and 6b shows the constructed harvester in two states. Frame 100 and electromagnet unit 110 are fixed to plan 902 such that side 11041 of core 1104 is connected to frame 100. Magnet 120 is inside unit 130 such that side 1201 touches side 1301 and side 1202 touches side 1302.

In FIG. 6a the harvester is at one position such that side 1302 touches extensions 1002 and 1003 and such that side 11042 of core 1104 touches side 1301. In FIG. 6b the body (2) bends and cause the bending of the two arms such that 1301 touches extensions 1004 and 1005 while side 11042 of core 1104 touches side 1302.

Moving from one position to the other position reverses the polarity of the magnetic flux and results in an impulse of electromotive power between the two ends of the coil. Such a configuration may harvest energy as high as several milli-joules per switching. It is noted that in this embodiment a ferromagnetic material surrounds the coil such that the magnetic field is even denser around the coil such that the change in the flux that is induced by toggling between the two positions is higher.

One major importance of this invention is therefore toggling between two states each time the body bends. Clearly this means that a minimum bending of the Bending Energy Harvester is required for such switching step to take place.

The embodiment above uses the bending to displacement convertor that is described in PCT number PCT/IL2019/051302, where the displacement was used to generate rotation in a generator. In the current patent application this displacement is used to create a relative lateral movement between a magnet and a coil or for toggling between states that cause magnetic flux reversal in a coil.

It is noted that the use of such bending to lateral displacement convertor is used only to exemplify a mechanism for such relative movement and such magnetic flux inversion, and that other mechanisms may be used to activate the harvester.

Figure 7:
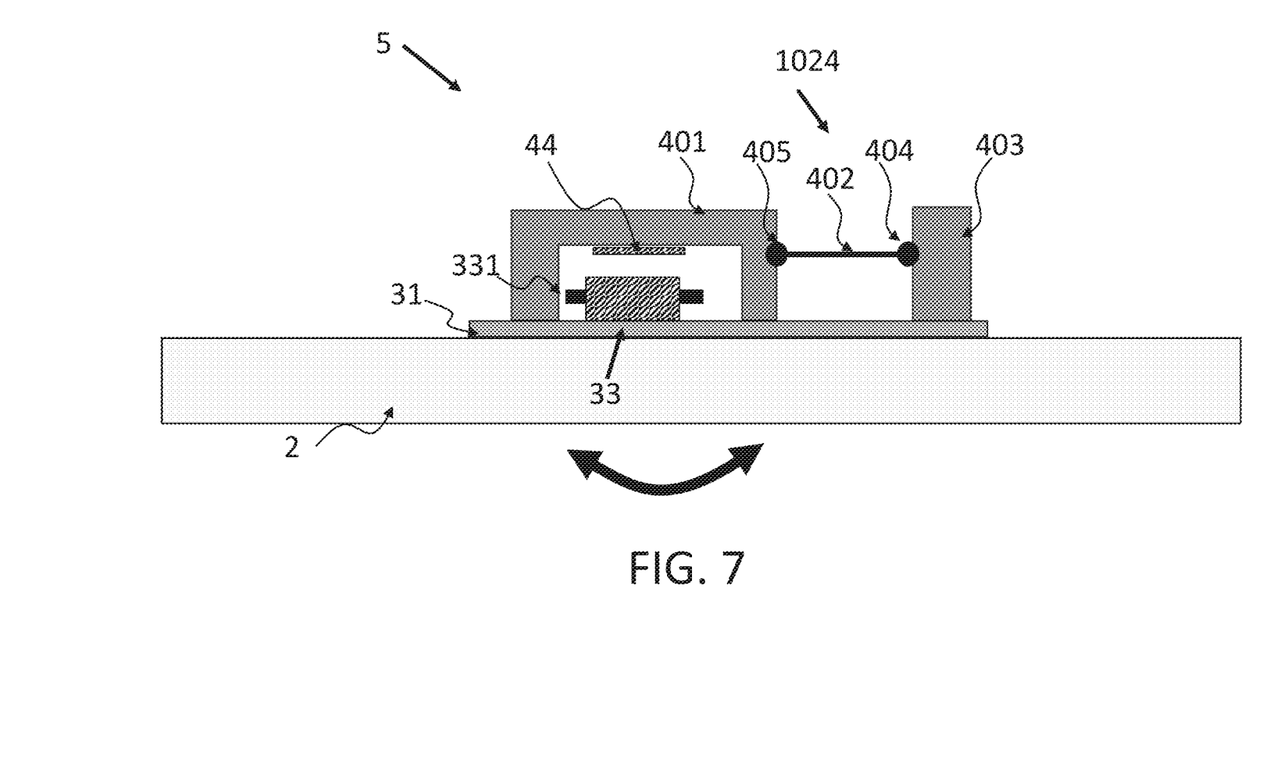
FIG. 7: A simplified schematic for the harvester described in FIG. 2.

Reference is made to FIG. 7 which schematically illustrates another possible way to activate the harvester described in FIG. 2. electromagnetic unit 33 is connected on base 31 that is connected to body 2 and magnet 40 is mounted on frame 401 that may slide on base 31. The bending to movement converter 1024 comprises arm 402 that is connected to frame 401 and to support 403 through hinges 404 and 405, such that bending body 2 moves frame 401 and magnet 44 relative to electromagnetic unit 33.

Figure 8:
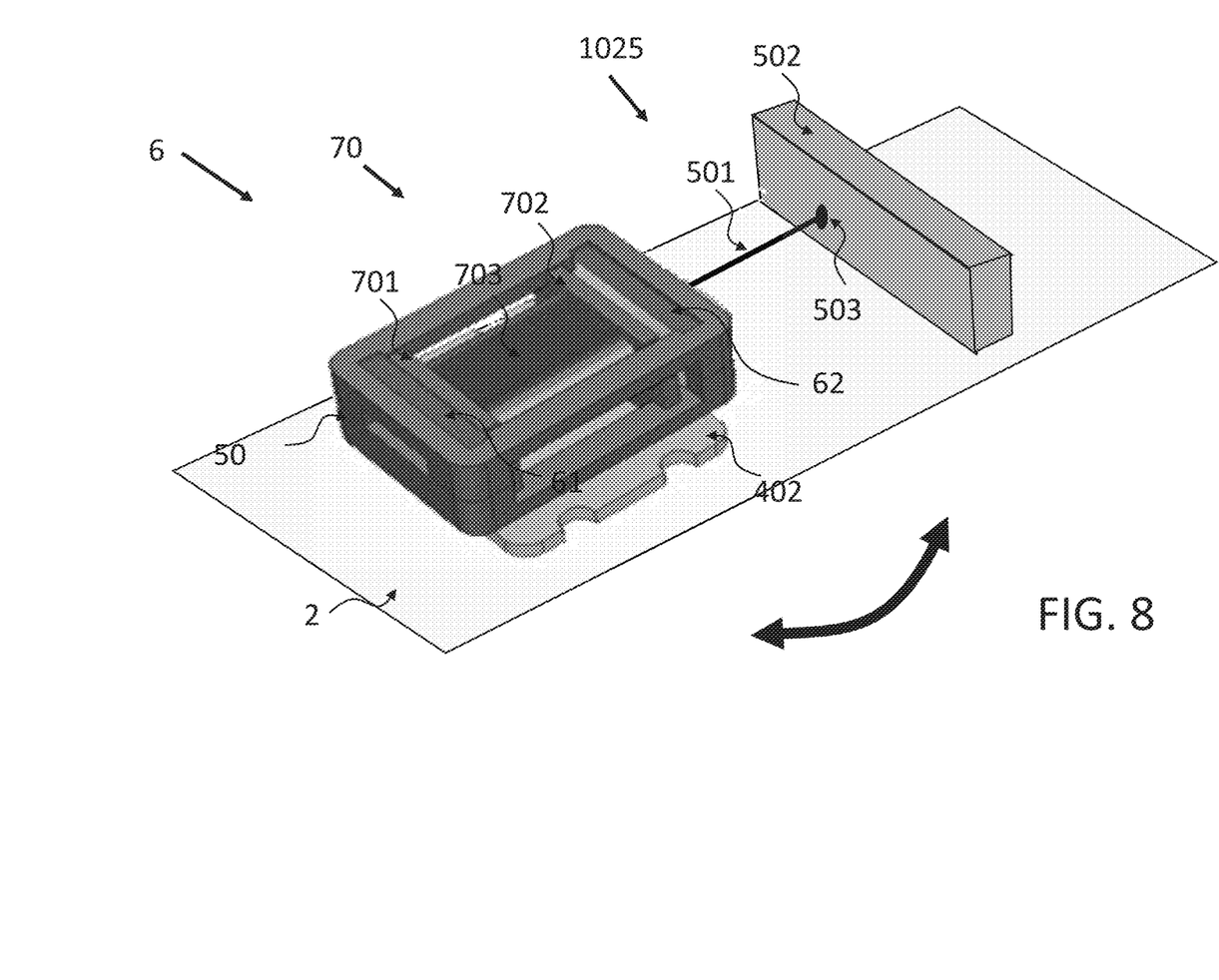
FIG. 8: A simplified schematic for the harvester described in FIGS. 3 and 4.

Reference is made to FIG. 8 which schematically illustrates another possible way to activate the harvester described in FIGS. 3 and 4. In FIG. 8 the electromagnetic device 70 is mounted on plate 402 that is connected to body 2. The bending to movement converter comprises arm 501 that is connected to support 502 through hinge 503. Additional hinge may be used to connect arm 501 to from 50. Support 502 is connected to body 2 such that bending of body 2 moves frame 50 with magnets 61 and 62 relative to the electromagnetic device 70 and between two states that reveres the polarity of the magnetic flux in the electromagnetic device.

Figure 9:
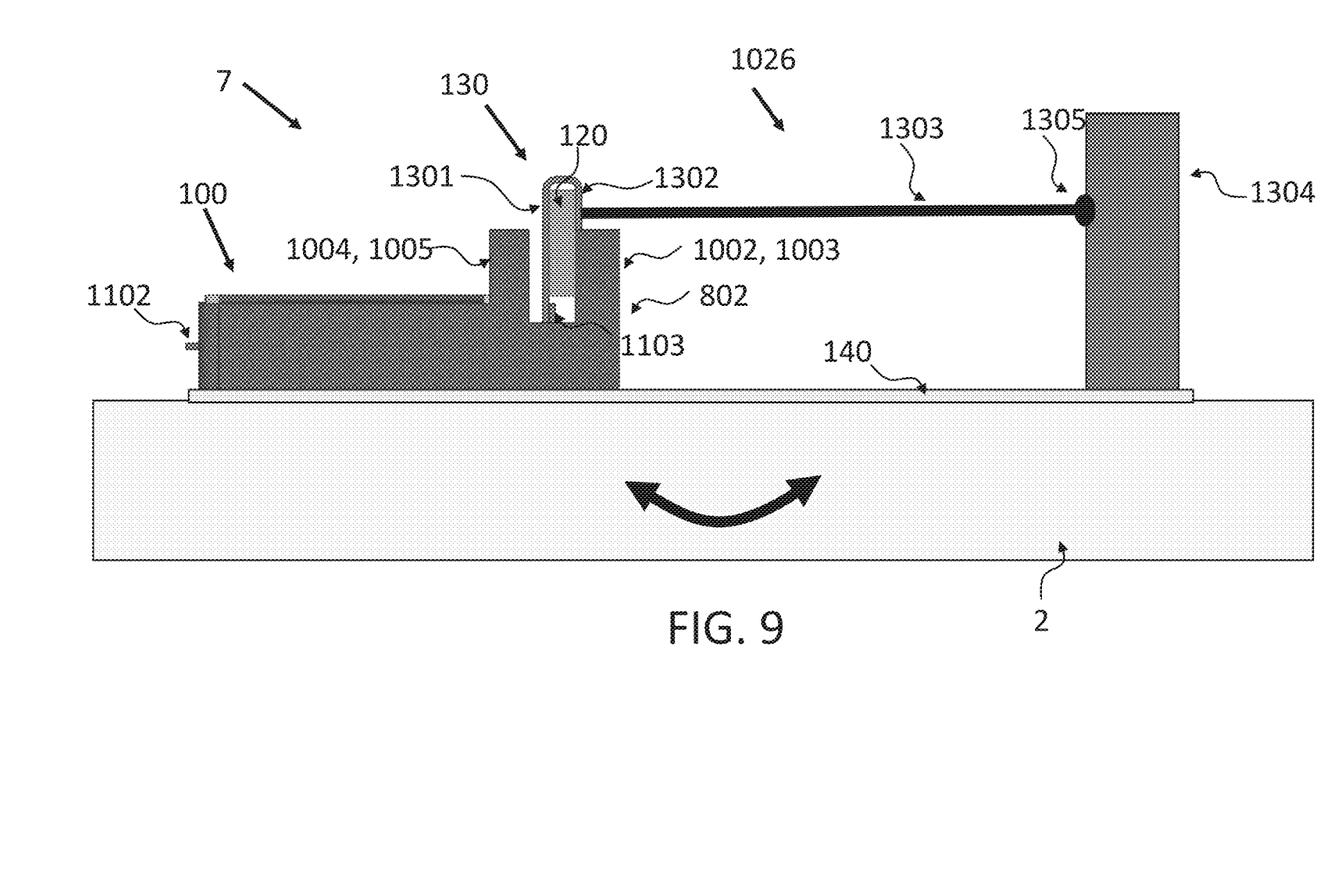
FIG. 9: A simplified schematic for the harvester described in FIGS. 5 and 6.

Reference is made to FIG. 9 which schematically illustrates another possible way to activate the harvester described in FIGS. 5 and 6. Here frame 100 is that houses the electromagnetic unit 1100 as shown in FIG. 5, is connected to base 140 that is connected to body 2. The bending to movement converter 1026 comprises arm 1303 is connected though hinge 1305 to support 1304 that is connected to body 2 such that bending of body 2 shifts magnet unit 130 with magnet 120 between the two states.

In embodiments shown in FIGS. 7 through 9 a support (403, 502 and 1304) was used to connect an arm (402, 501 and 1303) to body 2. It is clear that such a support is not required in every applications. For example, in case of applying the harvesters on tire, the bending of the tire may allow connecting the arm directly to the tire without a support. I addition, in embodiments shown in FIGS. 7 through 9 the hinges are shown schematically. It is clear that these hinges are designed to allow movement of arms ((402, 501 and 1303) as a result of bending of body 2 in order to allow proper functioning of the harvesters. It is also clear that in some cases more than one hinge is will be required.

It is understood that in some cases it is possible to use the body itself instead of the parts in the harvester that is connected to the body.

Other mechanisms may be designed in order to activate the Bending Energy Harvester described in this patent application. These designs may use different geometries comprising two parts where one part holds magnets and one part holds an electromagnetic devices such that the two parts are free to move one relative to the other for example by having a hinge connection between them such that when mounted on a body, the bending of the body move the two parts one relative to the other such that the magnets move relative to the electromagnetic device.

In addition, it is possible to include spring such that once a minimum bending is reached the spring is released and moves the magnet relative to the coil such that the polarity reversing of the flux is faster and thus dΦ/dt.

The Bending Energy Harvesters described in this patent application were shown such that in the initial state the bending arms are flat. It is clear that the initial state may be bent to fit the body the harvester they are fixed to.

In one embodiment of this patent application a device for converting bends of a body to electricity, is designed to be fixed to the body. The device comprises an electromagnetic device that includes a coil and a core, a magnet and a converter that is designed to convert bending of the body to a movement of the magnet relative to the electromagnetic device such that repeatedly impulses of electric power are generated by the coil.

In another embodiment of this patent application a device for converting bends of a body to electricity, is designed to be fixed to the body. The device comprises an electromagnetic device that includes a coil and a core with a first end and a second end, a frame that is designed to enclosed said electromagnetic device, a converter that is designed to convert bending of the body to a movement of the fame, a first magnet that is designed to be fixed to a first side wall of the frame and a second magnet that is designed to be fixed to a second side wall of the frame, whereby a back and forth movement of the body causes a back and forth movement of the frame from a first state in which the first magnet touch the core in its first end to a second state in which the second magnet touch the core in its second end, such that the magnetic flux in the core can repeatedly reversed such that repeatedly impulses of electric power are generated by the coil.

In another embodiment of this patent application a device for converting bends of a body to electricity, is designed to be fixed to the body. The device comprises an electromagnetic device that includes a coil and a core with a first end and a second end, a magnet with a first extension that is attached to a first side of the magnet and a second extension that is attached to a second side of the magnet, a converter that is designed to convert bending of the body to a movement of the magnet, wherein said device can be in a first position in which the first extension connects the first side of the magnet to the second end of the core and in which the second side of the magnet is connected to the first end of the core through a medium; wherein said device can be in a second position in which the second extension connects the second side of the magnet to the second end of the core and in which the first side of the magnet is connected to the first end of the core through said medium; whereby a back and forth movement of the body causes a back and forth movement of the magnet from the first position to the second position, such that the magnetic flux in the core can repeatedly reversed.

Figure 10:
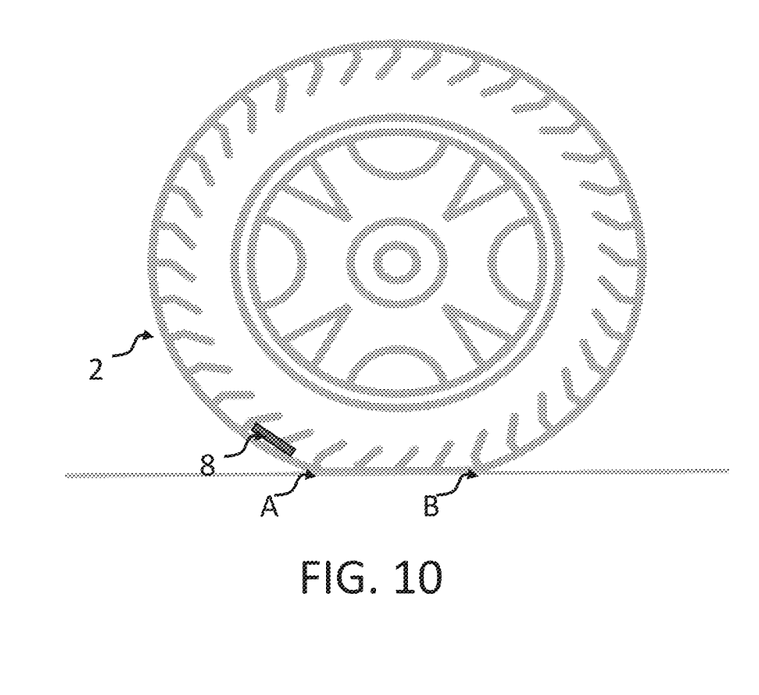
FIG. 10: Example of using the Bending Energy Harvester inside a tire such that the Bending Energy Harvester is placed along the tire circumference.
Figure 11:
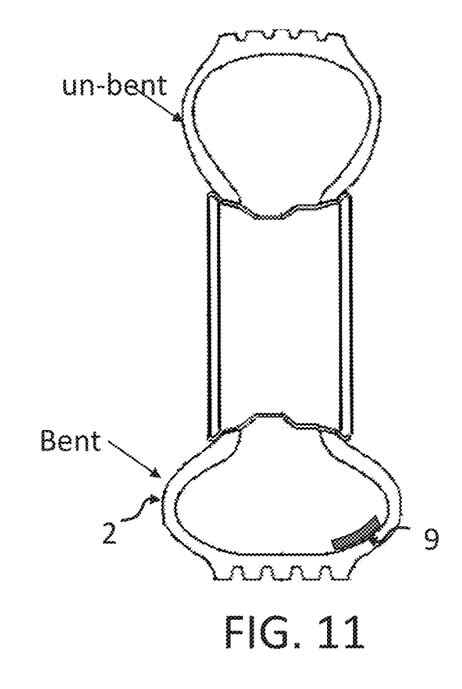
FIG. 11: Example of using the Bending Energy Harvester inside a tire such that the Bending Energy Harvester is placed vertically to the tire circumference.

Reference is made to FIG. 10 that exemplifies the use of Bending Energy Harvesters (8) for harvesting power from tire (2). The harvester may be attached to the inside of a tire or imbedded inside the tire and generate electricity as a result of random bending of the tire. In continues mode as exemplified in embodiment of FIG. 2, the bending result in movement of the magnet relative to coil. In toggle mode as exemplified in embodiment of FIGS. 3 through 9, not all bending will result in reversing the flux polarity, yet every bend beyond the minimum require will result in significantly high energy. The relative movement or toggling may take place at the contact of the tire and the ground. The contact of the tire is characterized by a flat section and therefore the bending take places at point 'a' and point 'b' shown in FIG. 10. The harvester may also be placed vertically as shown in FIG. 11. These bending are relatively known, and a mechanical device may be designed to generated movement of a magnet relative to the coil as well as toggling between states such that each toggling steps reverses the flux polarity.

Figure 12A:
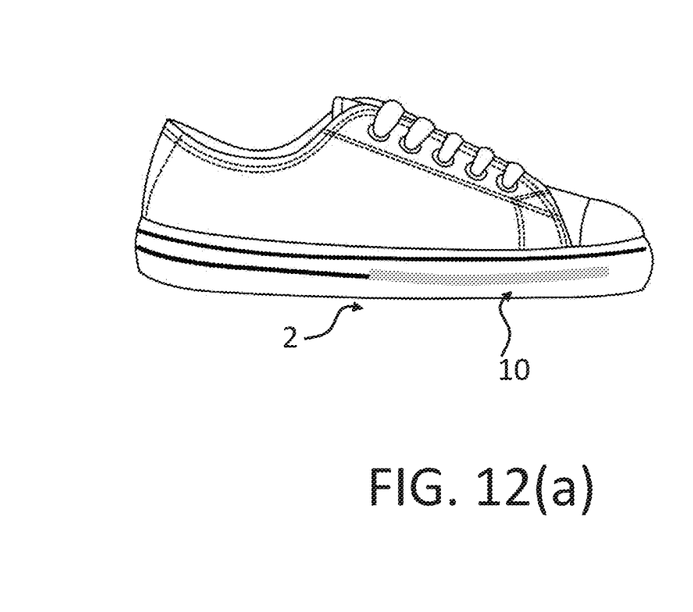
FIGS. 12(a) and 12(b): An example of using the Bending Energy Harvester inside a shoe for harvesting energy from walking.
Figure 12B:
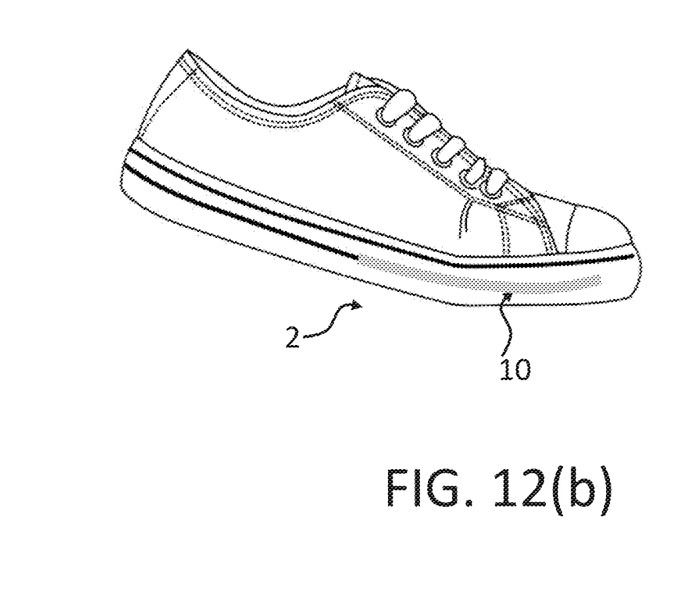
Figure 13:
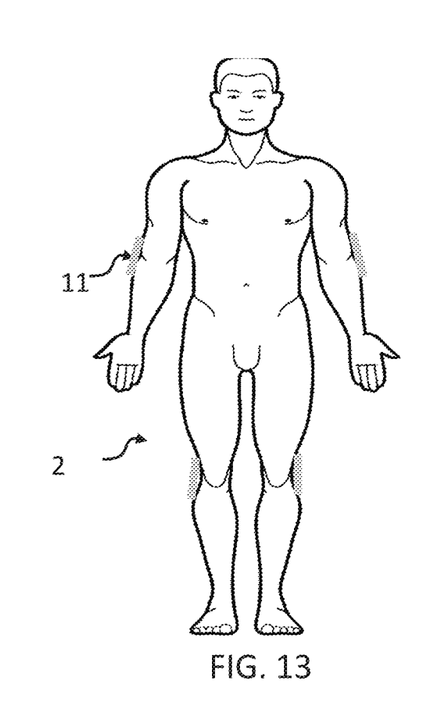
FIG. 13: An example of using the Bending Energy Harvester for harvesting energy from limbs capable of bending.

Reference is made to FIG. 12 that exemplifies the use of a Bending Energy Harvester (10) inside a shoe (2) for converting human walking or running to electricity. The Bending Energy Harvester is location where the rotation of the Generator's rotator is optimized for human walking and running. With that respect, it is noted that the Converter main effect is in the front side of the shoe, around the Mp joint, where the fingers bend. The Bending Energy Harvester can be applied to any limbs (2) that goes through bending as exemplified in FIG. 13.

Figure 14:
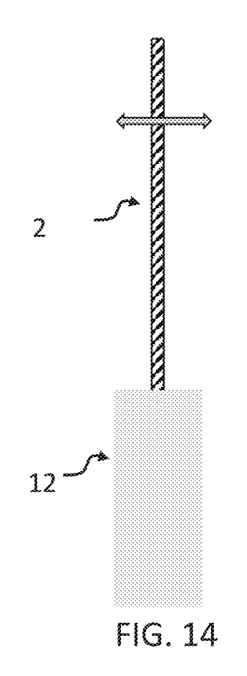
FIG. 14: An example of using the Bending Energy Harvester for harvesting energy from wind or sea waves.
Figure 15:
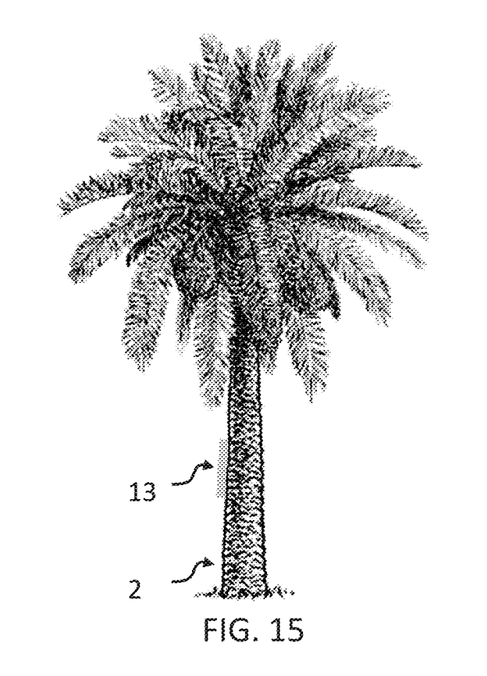
FIG. 15: An example of using the Bending Energy Harvester for harvesting energy from tree.

Reference is made to FIG. 14 that exemplifies the use of a Bending Energy Harvester (11) to convert wind power or wave power such as ocean waves. It is preferable to design the Bending Energy Harvester such that wing (2) is designed to oscillate back and forth at a rate that is slower or equal the response time of the Generator such that full swing of the wing is used. In a similar way, FIG. 15 exemplifies the use of the Bending Energy Harvester (12) for harvesting energy from movement of tree (2).

It is clear that the examples in FIGS. 10 through 15 demonstrate that use of the Bending Energy Harvesters and may use any Bending Energy Harvester described in this patent application As stated above the device (harvester) for converting bends of a body to electricity can be used in many situations and for many components. For example, it can be used inside a wheel of a vehicle. The term vehicle hereinafter and in the claims refers to any kind of a transport machine that has at least one wheel that includes a rim and a tire, such as, cars, trucks, buses, tractors, bicycles, wagons, and the like.

Figure 16A:
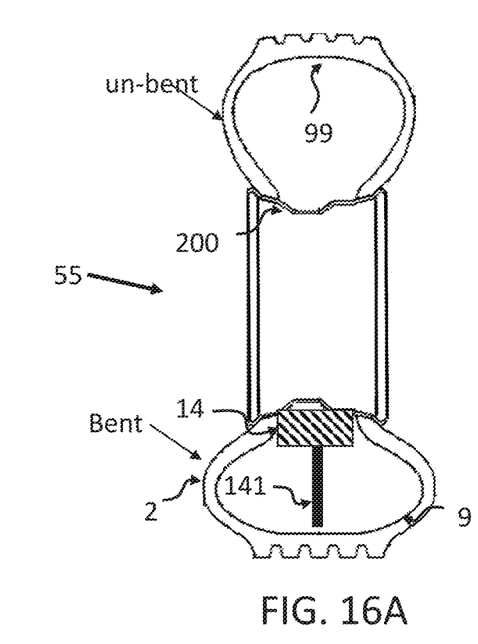
FIGS. 16A-16C: Example of using an Energy Harvester for harvesting energy in a wheel such that the harvester is located on the rim of the wheel.
Figure 16B:
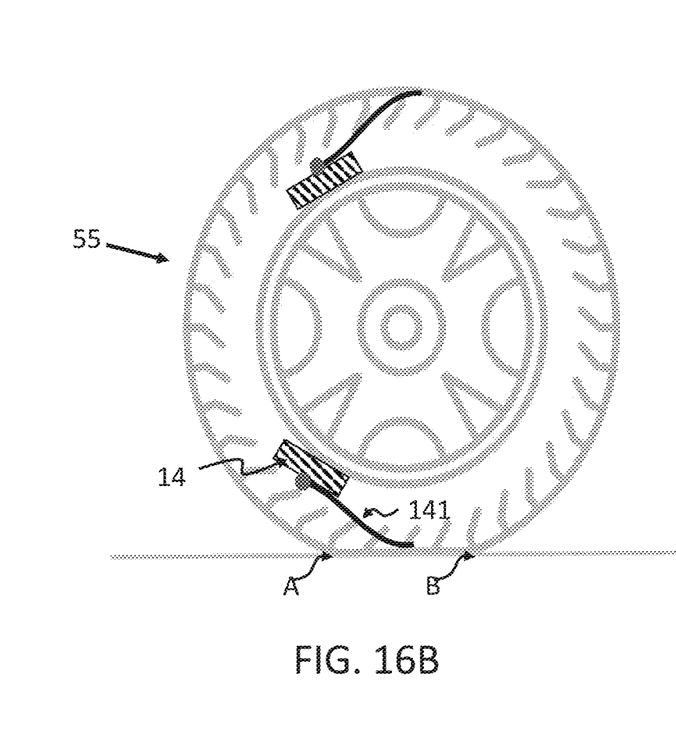

The present invention also relates to the wheel of a vehicle that includes a rim, a tire and the device for converting bends of a body to electricity. It is known that the part of the tire that is in contact with the ground at any given moment bends relatively to other parts of the tire. Therefore, if we fix the device to the inner side of the rim or to the inner side of the tire and allowing the bending to movement device (that includes one or two arms) to lean on the inner part of the tire, then whenever that part of the tire is adjacent to the ground (the road), this part will bend (squeezed) and will cause the bending to movement device to bend too, so that every full turn of the wheel the bending to movement device will bend and will generating electricity A reference is made to embodiments described in FIGS. 16A-16B. FIG. 16A shows a front cross section of a wheel (55) and FIG. 16B is a side view of the wheel (55) that includes a rim with an inner side (200) and a tire with an inner side (99). The harvester for converting bends of the tire to electricity (14) may be placed on the inner side of the rim (200), or the inner side of the tire (99). It is possible to use an extension arm (141) that extends from the harvester, for example arm 402 in FIG. 7, or arm 501 in FIG. 8, or arm 1303 in FIG. 9, in a way that it touches, lean or is simply close to the inner side of the tire such that when the tire bends then the extension are moves or bends such that it induces movement in the energy harvester according to any embodiment described in this patent application.

Figure 16C:
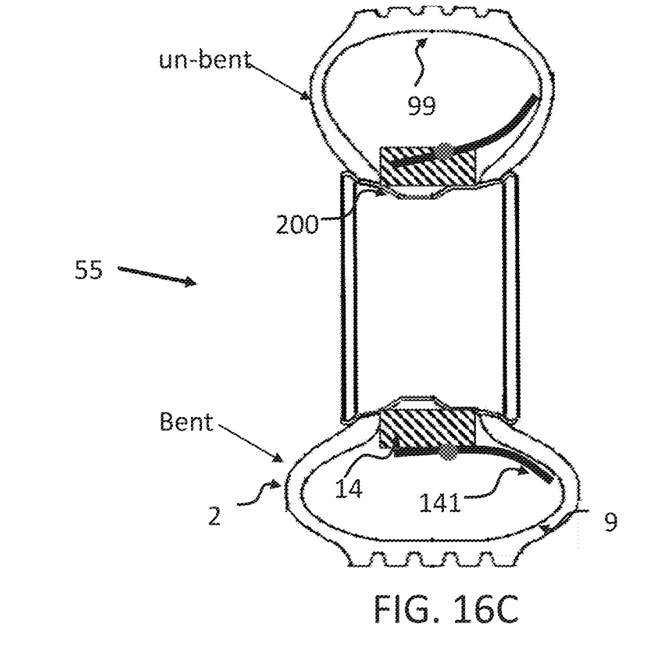

In FIG. 16C the harvester (14) is shown in two positions. In the upper position the tire is unbent, and the extension arm (141) is in a loose and free state. In the bottom position the tire is in a bend position (due to the contact with the road) and the extension arm is in its second state: bending state. Moving from one state to the other state activates the energy harvester as described in different embodiments in this patent application.

A reference is made to embodiment described in FIG. 16C that shows a cross section of the wheel (55). In this embodiment the energy harvester 14 is placed on the inner side of the rim 200. The extension arm 141 extends from the energy harvester touches, lean or is close to the side of the tire such that when the tire bends the extension moves or bends such that it induces movement in the energy harvester according to any embodiment described in this patent application.

In this figure the energy harvester is shown in two states. In the upper position the tire is unbent, and the extension arm is in a loose state. In the bottom position the tire is bent and the extension arm is at its second state: bending state. alternating from one state to the other state activates the energy harvester as described in different embodiments in this patent application.

The extension arm as depicted in FIGS. 16A-16C is shown only as a demonstration. The arm can be made of metal or any flexible material such as rubber or a material that can be compressed, as long as it is stiff enough to create the required movement in the harvester.

What is claimed is:

1. A wheel of a vehicle, comprising: a rim, a tire, and a device for converting a bend of the tire to electricity;
   wherein said device comprises:
   an electromagnetic device that includes a coil and a core with a first end and a second end,
   a frame that is designed to enclosed said electromagnetic device,
   a converter that is designed to convert bending of the tire to a movement of the frame,
   a first magnet that is designed to be fixed to a first side wall of the frame and a second magnet that is designed to be fixed to a second side wall of the frame,
   wherein said converter includes a bending to movement device; wherein said bending to movement device is designed to be fixed to an inner side of the rim or to an inner side of the tire, in a way that the bending to movement device alternately bends and straightens when the wheel rotates;
   wherein the bend of the tire causes a back and forth movement of the frame from a first state wherein the first magnet touches a first end of the core to a second state wherein the second magnet touches a second end of the core, such that the magnetic flux in the core can repeatedly reversed.

2. A device for converting bends of a body to electricity, that is designed to be fixed to the body, comprising:
   an electromagnetic device that includes a coil and a core with a first end and a second end,
   a frame that is designed to enclosed said electromagnetic device,
   a converter that is designed to convert bending of the body to a movement of the frame,
   a first magnet that is designed to be fixed to a first side wall of the frame and a second magnet that is designed to be fixed to a second side wall of the frame,
   wherein a back and forth movement of the body causes a back and forth movement of the frame from a first state wherein the first magnet touches a first end of the core to a second state wherein the second magnet touches a second end of the core, such that the magnetic flux in the core can repeatedly reversed.

3. A device for converting bends of a body to electricity, that is designed to be fixed to the body, comprising: an electromagnetic device that includes a coil and a core, a magnet and a converter that is designed to convert bending of the body to a movement of the magnet relative to the electromagnetic device.

* * * * *